United States Patent
Bradbery

(10) Patent No.: US 7,212,318 B2
(45) Date of Patent: May 1, 2007

(54) APPARATUS AND METHOD FOR AN ENHANCED READING DEVICE WITH AUTOMATIC LINE REGISTRATION

(75) Inventor: Eric J. Bradbery, Boca Raton, FL (US)

(73) Assignee: Pamela Bradbery, Coral Springs, FL (US)

( * ) Notice: Subject to any disclaimer, the term of this patent is extended or adjusted under 35 U.S.C. 154(b) by 547 days.

(21) Appl. No.: 10/604,222

(22) Filed: Jul. 1, 2003

(65) Prior Publication Data

US 2004/0100666 A1 May 27, 2004

Related U.S. Application Data

(60) Provisional application No. 60/429,196, filed on Nov. 26, 2002.

(51) Int. Cl.
*H04N 1/04* (2006.01)
*H04N 1/393* (2006.01)
*H04N 1/387* (2006.01)

(52) U.S. Cl. ............... 358/474; 358/497; 358/451; 358/453; 358/909.1; 358/527

(58) Field of Classification Search ........... 358/497, 358/494, 474, 471, 505, 451, 909.1, 453, 358/527; 382/114, 312, 318, 319, 298, 299, 382/293; 348/373, 211.7, 63, 62
See application file for complete search history.

(56) References Cited

U.S. PATENT DOCUMENTS 3,816,646 A 6/1974 Cinque
3,993,865 A 11/1976 Browne et al.
4,136,361 A 1/1979 Doan
4,893,196 A * 1/1990 Koshiyouji et al. ......... 358/474
4,928,170 A 5/1990 Soloveychik et al.
5,046,163 A 9/1991 Priest et al.
5,136,151 A 8/1992 Kobayashi
5,586,196 A 12/1996 Sussman
5,610,720 A * 3/1997 Fujioka et al. ............. 358/296
5,687,943 A * 11/1997 Campbell .................. 248/331
5,729,283 A 3/1998 Meyer et al.
6,064,426 A * 5/2000 Waterman .................... 348/63
6,115,482 A * 9/2000 Sears et al. ................. 382/114
6,166,857 A 12/2000 Arai et al.
6,791,600 B1 * 9/2004 Chan ........................... 348/63
6,965,412 B2 * 11/2005 Reed et al. ................. 348/373
2004/0036663 A1 * 2/2004 Bevers et al. .................. 345/7

FOREIGN PATENT DOCUMENTS

WO WO 2005101349 A1 * 10/2005

* cited by examiner

*Primary Examiner*—Cheukfan Lee

(57) ABSTRACT

An enhanced reading device which secures written material in a fixed location, and moves a video camera across the written text or images for the purpose of automatically registering the video camera at the beginning of each new line. The device uses a manually operated transmission to move the video camera across a line at a speed controlled by the user. The video camera is also stepped to the next line under control of the user. Optional embodiments permit the transmission to be powered and control by push buttons for automatic registration at the beginning of new lines. The device also has a document tray assembly to control vertical movement of the document in relation to the video camera under control of the user. The document tray assembly can also be optionally powered rather than manually operated.

15 Claims, 17 Drawing Sheets

APPARATUS AND METHOD FOR AN ENHANCED READING DEVICE WITH AUTOMATIC LINE REGISTRATION

CROSS-REFERENCE TO RELATED APPLICATIONS

This application is related to, and claims the benefit of, the provisional patent application entitled "Apparatus and Method for an enhanced Reading Device With Automatic Line Registration", filed Nov. 26, 2002, bearing U.S. Ser. No. 60/429,196 and naming Eric Bradbery, the named inventor herein, as sole inventor, the contents of which is specifically incorporated by reference herein in its entirety.

BACKGROUND OF INVENTION

1. Technical Field

The present invention relates to enhanced reading devices for the visually impaired. In particular, it relates to an enhanced reading device which automatically indexes to the next one or more lines and registers the optical reading device at the beginning of the lines.

2. Background of the Invention

A substantial number of individuals suffer from a variety of vision impairments which impairs their ability to conveniently read. One ailment in particular, macular degeneration, afflicts many individuals as they age. Macular degeneration results in the loss of central vision which directly impacts an individual's ability to read, since the reader must rely on peripheral vision. Typically, an individual with macular degeneration uses a magnifying glass to enlarge the written words to so that they can be more easily perceived. However, magnifying glasses have limitations on their ability to enlarge characters. Likewise, moving a magnifying glass across the written line often results in inadvertently moving to the wrong line when the reader steps from line to line. It would be desirable to have a method of enlarging characters beyond the scope of the conventional magnifying glass, and the method of stepping from line to line without losing one's place in the document.

The prior art has attempted to improve upon magnifying glasses through the use of small handheld television cameras which allow an individual to manually scan the camera across the written line. The output of the camera is input to a television screen which can selectively magnify the characters to any desired size which a particular television monitor is capable of displaying. While the use of handheld television cameras allow an individual to display larger characters, thus making it easier to read, handheld cameras may actually make line registration problems even more difficult. This is because the reader follows the camera on its path back to the beginning of the next line. This motion, when watching the television monitor, can result in dizziness and by high fatigue. It would be desirable to have a method of incrementing to a new line without having to carefully control the line registration while moving the camera.

SUMMARY OF INVENTION

The present invention provides an enhanced reading device that which secures written material in a fixed location and dynamically moves the optical reader across the written text for the purpose of automatically registering the optical reader at the beginning of each new line. The device uses a manually operated transmission to move a camera across a line, and to step the camera to the next line when appropriate. Optional embodiments permit the transmission to be powered and controlled by push buttons for automatic registration at the beginning of new lines. The device also has an integral elevator assembly to move the document closer or farther away from the television camera for the user's convenience. The elevator device uses a threaded rod to move the document tray vertically. In addition, the document tray is supported by side support arms. The elevator can also be optionally powered rather than manually operated.

DETAILED DESCRIPTION

Figure 1:
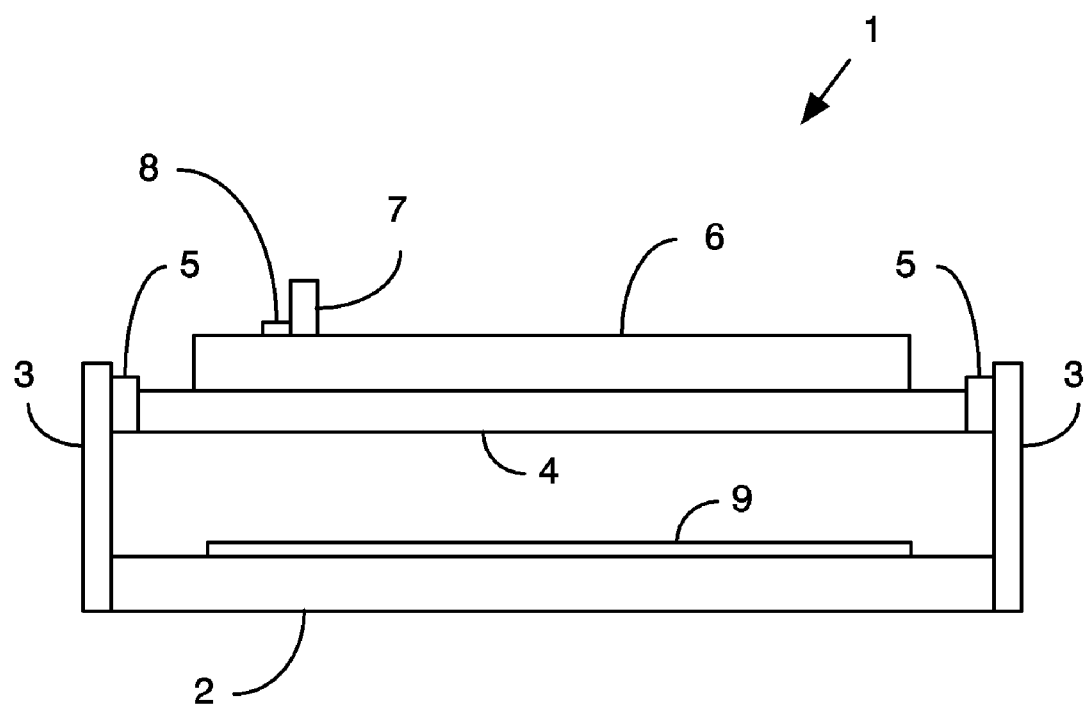
FIG. 1 is a front edge view of a preferred embodiment of an enhanced reading device which illustrates a document support tray, a camera assembly, a longitudinal support, a lateral camera assembly support, and side supports.

Prior to a detailed discussion of the figures, a general overview of the system will be presented. Enhanced reading devices have been developed to assist individuals with severe vision problems. For example, individuals with macular degeneration have substantially degraded central vision and are unable to read normal sized text. Likewise, there are numerous other vision impairments (e.g., corioretinitus, physical injuries, etc.) which also substantially reduce an individual's ability to read normal text.

The prior art has provided a number of devices to assist individuals with vision impairments. An early attempt to help individuals with vision impairment has been to provide a document viewer, similar in structure to those used for microfiche, which have a movable tray to hold text material. An optical lens and lamp assembly is provided to project an enlarged image of the document text onto the viewer's screen. The individual moves the tray manually from line to line in order to read the enlarged text on the viewer screen. Alternatively, the document can be placed in a fixed position and the optical lens and lamp assembly can be moved over the document.

An alternative prior art embodiment uses a television camera in the same manner, with the exception that instead of a projected image displayed on a viewer screen, the image detected by the camera is enlarged and input to a television screen to provide an image large enough for the individual to read.

Prior art systems having large-scale computing capacity have also been developed which can read entire documents, and via software, present images to a user via computer monitor. While the systems can be effective, they are also very expensive and out of reach of many individuals who may have more limited funds, and/or limited computer knowledge.

These prior art embodiments have a significant drawback in that they are manually operated devices which require the individual to move either the document or a camera from place to place on the document. Due to erratic movement caused by manual operation, in combination with the enlarged image which the user uses to guide movement of the device, the image used by the individual is visually irritating and is prone to mistakes due to the fact that the individual may move more than one line at a time and waste substantial time during the alignment process in order to finish reading a document. In addition, highend computer systems are not available to many individuals due to cost, or due to an individual's lack of expertise with computers. This invention improves upon all the foregoing by providing a low-cost, easy-to-use system, which requires a minimum of processing power (without the need for a complete computer), which requires no computer knowledge, and can use the individual's conventional television in place of a computer monitor.

The invention eliminates the foregoing problems by automatically indexing to the next line and registering the optical device at the beginning of the line. This eliminates a substantial amount of work which the individual experiences when moving the optical device in relation to the document text. It allows the individual to quickly and automatically step from one line to another which substantially reduces the effort and fatigue involved with using prior art devices of this type.

The invention is able to move an optical assembly over a document in an automatic fashion such that as the individual moves from line to line, and registers the optical device at the beginning of each new line, the movement is done in a controlled manner which eliminates the need for the individual to manually move the device and observe the image as it rapidly moves over the text. This is accomplished by the longitudinal platform which steps the camera down through the page, and a lateral optical camera support which moves the camera to the beginning of each line on the page. As a result of this automatic and controlled movement, the invention eliminates the effort expended by the individual, and its associated fatigue, which was required by prior art devices.

The ease of discussion, the movement of the camera from the top of the page to the bottom of the page was described as being on a line by line basis. However, depending on the size of the monitor, and the size of the characters as they are displayed on the monitor, the individual does not have to advance the camera every time a new line is read. In particular, the monitor may very adequately display several lines at a time. In fact, if larger television screens are used, it would not be difficult to display 3–6 lines, or even more.

The preferred embodiment also uses a mechanical drive system to illustrate the ability of the invention to precisely move the camera from line to line, and also to register the camera at the beginning of line. This is possible because the document being read can be placed on its support tray and not moved. Since the only part of the visual system which is moving is the camera, and not the source text, then the device can control movement of the camera such that it does not slide from line to line as is often the case for manual camera displays. The inadvertent sliding across lines happens because the individual is not able to precisely control the camera when it is handheld. This is also true for devices which would use a fixed camera and a slidable tray. A manually slidable tray will have the same problems that a manually held camera will. Namely it relies on the precision of the individual as the individual's hand moves the device in question. This eliminates a substantial amount of fatigue because the individual does not have to carefully monitor the screen to make sure that the camera is not sliding from line to line. Instead, the camera can be operated such that moves in only one axis at a time, thereby ensuring that it does not skip lines. While the mechanical drive, discussed in the specification accomplishes this controlled single axis motion, those skilled in the art will recognize that the invention can also be implemented electronically.

In order to implement the invention electronically, the manually driven gear system can be replaced with a motorized system which is operated by buttons to control the advance line, and also to initiate equivalent of a carriage return when registering at the beginning of the line. Mechanical line advance and registration devices such as this are well known in the typewriter arts and need not be discussed further here. Replacement of a manually operated system with a motorized system provides advantages to disabled individuals who may not be able to operate the manual drive due to a variety of physical impairments. We turn now to a more detailed discussion of the figures.

FIG. 1 is a front edge view of a preferred embodiment of an enhanced reading device 1. This figure illustrates the main components of the enhanced reading device 1 which includes a document support tray 2, a longitudinal support 4, a longitudinal support drive 5, a lateral camera assembly support 6, a camera assembly 7, a camera assembly drive 8, and side supports 3. Also shown is the top edge of a document 9 which rests on the document support tray 2.

For ease of discussion, the embodiment of FIG. 1 is first presented with a camera position control that uses a manually controlled mechanical transmission to move the camera laterally within a camera assembly drive 8, and to move the camera assembly drive 8 longitudinally under control of a belt drive. As mentioned above, it is also possible to use non-typewriter carriage technology to control spacing with a line, and line indexing. In addition to the mechanical embodiment shown and FIG. 1, an alternative preferred embodiment is also envisioned which uses a fully electronic system that further eliminates effort on the part of the individual, and increases accuracy.

During the reading process, the camera assembly 7 is positioned at the beginning of the first line. As the individual reads the document 9, a camera assembly 7 is moved laterally under control of the camera assembly drive 8 along a path in the lateral camera assembly support 6. The use of the path in the camera assembly support 6 eliminates accidental movement from one line to another which can occur during manual operation.

Once the camera assembly 7 reaches the end of the text line in the document 9, the system automatically steps to the next line and registers at the beginning of the new line. This is functionally equivalent to a carriage return on a conventional typewriter. Overall movement of the camera assembly 7 is accomplished as follows. The longitudinal support 4 is moved longitudinally from the top edge of the document 9 toward the bottom of the document 9. Motion is controlled by the longitudinal support drive 5 which moves the camera assembly 7 from line to line each time the camera assembly 7 reaches the end of a line of text, or when the individual instructs it to. When longitudinal support drive 5 steps to a new line on the document 9, the camera assembly 7 automatically moves to the beginning of the new line under control of the camera assembly drive 8. Likewise, in the event that multiple lines are being displayed simultaneously, and the camera assembly drive 8 can be instructed to return the camera 7 to the beginning of the line without indexing to the next line.

In the situation where an electronic drive is used, the determination of where lines begin and end can be implemented in several ways. The simplest method is to use movable tabs to indicate the beginning and the end of the lines. This can also be implemented in a manually operated embodiment. A simple mechanical implementation of this device would be to use two adjustable mechanical keys to indicate the beginning and the end of a line in the same manner as mechanical keys are used on conventional typewriters. In this embodiment, when the individual places the document on the document support tray 2, the individual moves the mechanical keys such that they provide stops at the beginning and at the end of a line of text. When the camera assembly drive 8 detects that it has reached a mechanical key which indicates a line end, it could automatically reverse direction after a suitable time period) and return to the beginning of a line. Preferably, the individual would command it to reverse direction to ensure that the individual has time to read the text at the end of the line. The camera assembly drive 8 would recognize when it reached the beginning of the line when it detected the mechanical key which was set up for that purpose. At the same time that the camera assembly drive 8 was returning the camera assembly 7 to the beginning of the text line, the longitudinal support 4 advances from the top of the document 9 towards the bottom of the document 9 in single line steps under control of the longitudinal support drive 5. The distance between lines may also be set as mechanical adjustment by the user when the document is first placed in machine. Adjustable mechanical line indexing is wellknown the typewriter arts and can be implemented here as a mechanical solution as well.

While the foregoing mechanical embodiment to control movement of the camera assembly 7 is possible, the following electronic solution is preferred due to an improvement in convenience for the individual. In particular, the preferred electronic embodiment eliminates the manual controls used to control motion of the camera assembly 7, as well as the time and effort required by the individual to adjust them.

A fully electronic embodiment works as follows. Once the document 9 is placed on the document support tray 2, the individual instructs the device to register at the beginning of the first line on the document. This would normally be done by instructing the processor 15, via the input device 16 (both shown and discussed in regard to FIG. 5), that the camera should begin reading a new page. Typically, the individual would select a key or enter a command from the input device 16 which the processor 15 would translate into a command which it would then send to the enhanced reading device 1. Once the camera assembly 7 was positioned at the beginning of the page, its output is sent to a monitor 14 (also shown and discussed in regard to FIG. 5) which displays the text viewed by the camera assembly 7. The initial determination of where the first line begins is automatically performed by the processor 15 based on input received from the camera assembly 7. Detection of textual line data in the field of image scanning and OCR (optical character recognition) technology is well-known in their respective arts and need not be discussed in greater detail herein. The same line detection technology can be implemented for automatic positioning of the camera assembly 7 at the beginning of the first line of text.

However, while automatic line detection has a high degree of reliability, depending on fonts styles, print quality, lighting, quality of the optical components, etc., it is possible for automatic line detection to be offset in error. Therefore, the preferred embodiment also envisions the use of an override by the individual to find tune and adjust the position of the camera in regard to text lines. Once the system has made its determination as to the location of the beginning of the page and the first line, the individual can instruct the processor 15, via input device 16, to move the camera assembly 7 to another location and then to set that location as the text line starting point. During this process, as well as during the reading process, the camera assembly 7 outputs a video signal to a monitor 14. In addition to using the monitor 14 as the magnification device for reading the text on the document 9, the individual can also use the monitor 14 in the process of adjusting the location of the line beginning and line end locations.

In addition to determining the longitudinal location of lines, and the lateral beginning and end points of individual lines, provision is also made for automatic adjustment of focusing. Those skilled in the art will recognize that the camera assembly 7 can be made more inexpensively if the camera assembly 7 is manually focused by the individual to allow for thickness changes in the document 9. Due to differences in thickness, focus adjustments may be necessary to ensure a clear picture on the monitor 14. While cost considerations are important, the preferred embodiment envisions a camera assembly 7 with automatic focusing capability. Automatic focus adjustment can be extremely valuable in a situation where a document 9 has a nonflat surface, such as a book, and has pages which bend due to the book's binding structure. The bending in each page of an open book causes each line to vary in its distance from the camera. As a result, automatic focus adjustment allows the camera to dynamically focus on words within a line as the distance is constantly changing between the camera lens and the page surface. Automatic focus adjustment is wellknown in the camera arts and need not be discussed further herein.

Once the document 9 has been inserted, the position and starting point of the textual data has been determined, and the focus has been adjusted, the individual can begin reading. In the preferred embodiment, the individual controls movement of the camera across the text line to suit the individual's personal reading speed. In addition, the individual also has the ability to control movement of the camera assembly 7 to the next line. Backspace capability is also provided to accommodate a reader who wishes to review an item of text. All of these controls are implemented via input device 16. Other optional features can also be included. For example, if the individual is reading the document 9 which has several independent articles, the system can also be set up to recognize paragraph breaks. This is relatively easy to accomplish since paragraph breaks usually are indicated by an extra line space, or by indented text at the beginning of the paragraph. The ability to recognize paragraph break can be easily implemented by looking for extended spacing between lines, and/or the appearance of an indented sentence beginning. By giving the individual the ability to step from one paragraph to another, the individual can rapidly and conveniently step through articles to reach the article of interest.

As can be seen, this enhanced reading device 1 allows an individual to insert a document 9, to automatically register the camera assembly 7 at the beginning of the page, and to automatically step from line to line under control of the individual. This allows an individual to conveniently view an enlarged version of a document on monitor 14 with a minimal amount of manual effort or skill. It allows an individual to view a document with a minimal amount of errors created by erratic hand movement of the camera or the document which was commonly prior art devices. This is particularly valuable when an individual has other infirmities, such as shaking or weak hands. In addition, the enhanced reading device eliminates the eye fatigue created by rapid movement of the document in prior art systems which required the individual to carefully watch in order to properly manually position the camera at the next line of text. As a result of the automatic line detection and registration functions provided by this invention, the individual can comfortably view a document without the inconvenience and difficulties associated with use of prior art devices.

Figure 2:
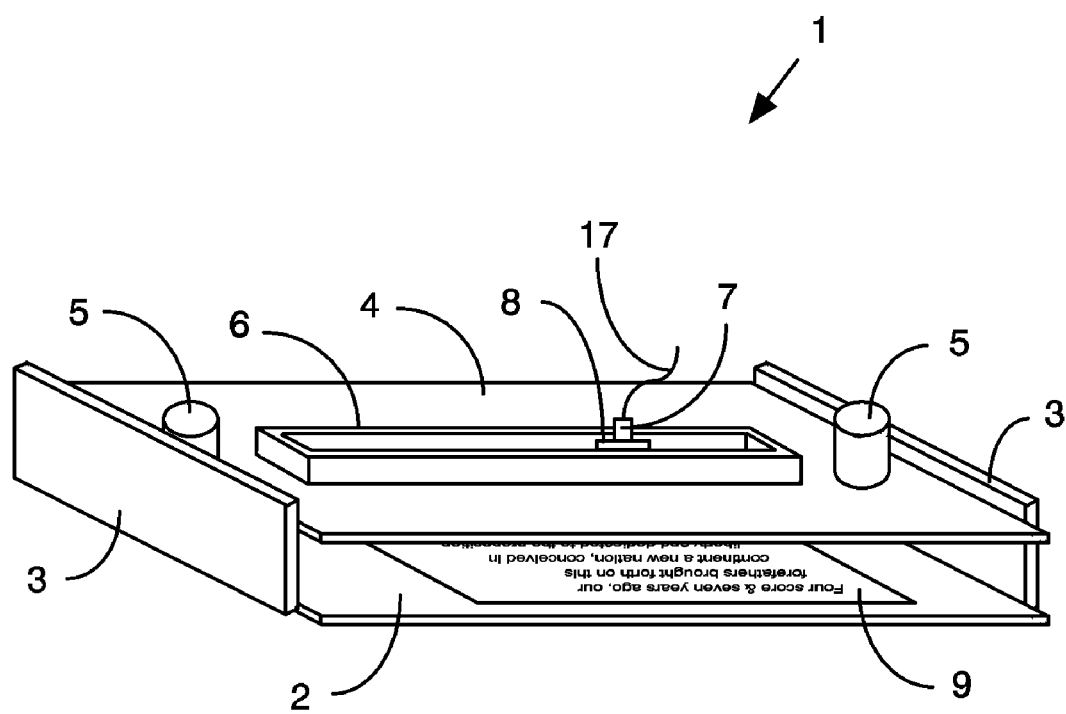
FIG. 2 is a perspective view of the preferred embodiment of FIG. 1 which illustrates a document support tray, a camera assembly, a longitudinal support, a lateral camera assembly support, and side supports.

FIG. 2 is a perspective view of the preferred embodiment of the enhanced reading device shown in FIG. 1. This figure provides another view of the document support tray 2 which is supporting document 9. In the preferred embodiment, the document support tray 2 is slidably mounted such that it can be pulled out from under longitudinal support 4. This allows the individual to conveniently insert the document 9 without obstruction by any other components of the enhanced reading device 1. The document support tray 2 can be physically separate from the rest of the enhanced reading device 1, or it can be slidably attached to the side supports 3 such that it pulls out in the manner of a drawer, or it can be hingedly attached to the rear of the enhanced reading device 1 at the side supports 3 such that the side supports 3 and the other components can be pivoted up and away from the document support tray 2 for document loading. While the simple method of sliding the document support out from under the other components of the enhanced reading device 1 is preferred, any suitable method of providing a document loading capability can be used.

The side supports 3 provide physical support for the longitudinal support 4. The side supports 3 raise the longitudinal support 4 to a sufficient height above the document support tray 2, such that documents 9 having a variety of thicknesses (e.g., a single sheet, a book, etc.) can be conveniently placed on the document support tray 2. While the side supports 3 are illustrated as solid panels and drawings, those skilled in the art will recognize that the side supports 3 can be implemented in any convenient manner.

During the reading process, the longitudinal support 4 is preferably moved longitudinally in a direction from the top of the document 9 to the bottom of the document 9. Automatic movement of the longitudinal support 4 is accomplished through the use of longitudinal support drives 5. In the preferred embodiment, the longitudinal support drives 5 move the longitudinal support 4 in a longitudinal direction in relation to the side supports 3. In the preferred embodiment, the longitudinal support drives 5 can be fixedly attached to the longitudinal support 4 and move the longitudinal support 4 in relation to the side supports 3. Alternatively, the longitudinal support drives 5 can be fixedly attached to the side supports 3, and from there move the longitudinal support 4 in relation to the side supports 3.

In the preferred embodiment, the longitudinal support drives 5 are controlled by the processor 15. Further, the preferred embodiment envisions the use of stepper motors as the longitudinal support drives 5 to precisely control the position of longitudinal support 4. Those skilled in the art will recognize that, in addition to stepper motors, any suitable alternative means to control position of the longitudinal support 4 can be used. For example, solenoids, emitter controlled motors, mechanical gear controlled motors, etc. can also be used to control position of longitudinal support 4. The only requirement of the drive means is that it have the capability of providing incremental motion to the longitudinal support 4 which can be controlled by the processor 14 for the purpose of precisely positioning the longitudinal support 4. It should be noted that it is also possible to create a manual stepping means which mechanically moves the longitudinal support 4. However, a manual stepping means does lose some of the convenience associated with the invention.

Also shown in this figure is the lateral camera assembly support 6. The lateral camera assembly support 6 defines an aperture in the longitudinal support 4 surface through which the camera assembly 7 can view portions of the document 9, below. The camera assembly 7 is moved laterally above a line of text by the camera assembly drive 8 in the same manner that the longitudinal support drives 5 move longitudinal support 4 in the longitudinal direction. Also shown in FIG. 2 is data line 17. Data line 17 would include, at a minimum, a video output line to provide video data to monitor 14. In addition, data line 17 may also include command lines from the processor 15, as well as information data lines from the enhanced reading device 1 to the processor 15 which can provide camera position data, camera focus data, etc.

While the foregoing embodiment is used for discussion purposes, it is intended to be exemplary in nature. A variety of changes can be made in how the camera assembly 7 is moved in relation to the document 9 without departing from the invention which provides automatic camera to line registration, and any suitable means can be used to provide the functions of each element within the invention.

Figure 3:
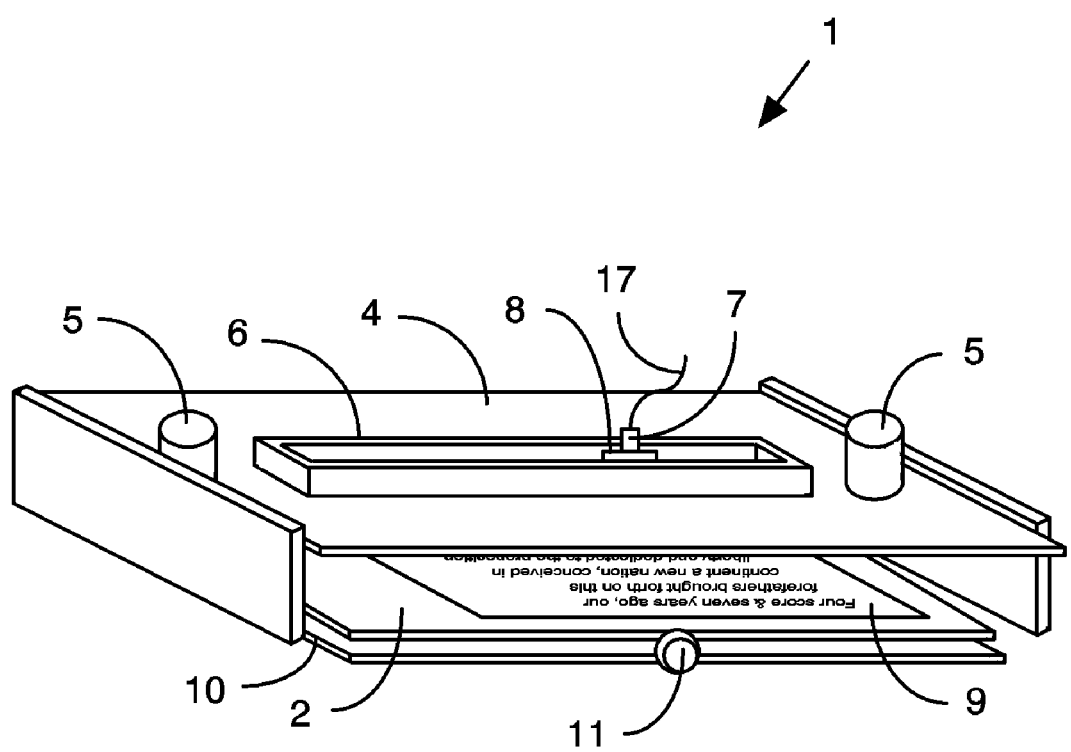
FIG. 3 is an alternative preferred embodiment of an enhanced reading device which illustrates a document support tray, a camera assembly, a longitudinal support, a lateral camera assembly support, side supports, and a lifting mechanism for the document support tray.

FIG. 3 is an alternative preferred embodiment of the enhanced viewing device 1 which illustrates the document support tray 2, the camera assembly 7, the longitudinal support 4, the lateral camera assembly support 6, and the side supports 3 shown in the foregoing embodiment. In addition, this figure also illustrates a document lifting mechanism 10. The document lifting mechanism 10 rests beneath the document support tray 2. It provides an adjustable support (not shown) which can be extended via height control 11. By using height control 11 to lift the document support tray 2 away from document lifting mechanism 10, the document support tray is moved toward camera assembly 7. As a result, the height control 11 can be used to manually adjust the focus of camera assembly 7 by altering the distance between camera assembly 7 and the surface of the document 9.

In the preferred embodiment, a simple mechanical lever invention is used to raise and lower the document support tray 2. However, those skilled in the art will realize that there are a variety of methods which can be used to change the distance between the document lifting mechanism 10 and the document support tray 2. For example, a gear driven lift can be used, a pulley based lift can be used, a hydraulic lift can be used, a scissor type lift can be used, a cam lift can be used, etc. Therefore, the exact type of lift mechanism can vary. The only requirement is that the lift mechanism be suitable for conveniently raising or lowering the document support tray 9 in relation to the camera assembly 7.

Figure 4:
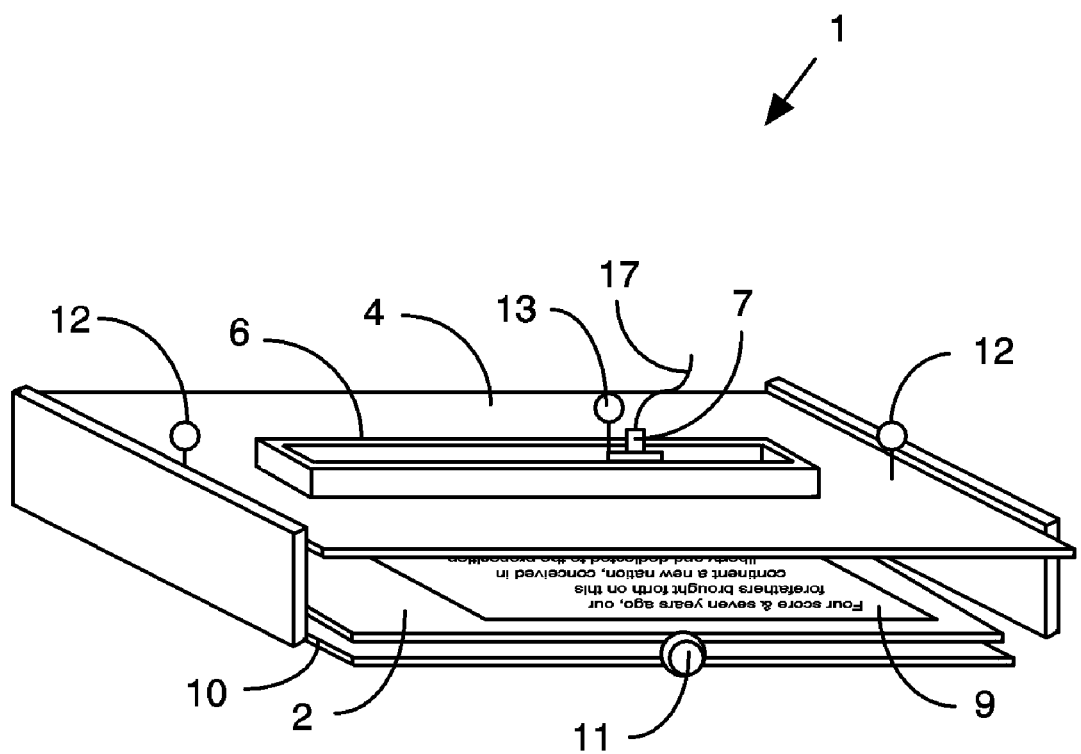
FIG. 4 is an alternative preferred embodiment of an enhanced reading device which illustrates a document support tray, a camera assembly, a manually operable longitudinal support, a manually operable lateral camera assembly support, and side supports, in combination with a lifting mechanism for the document support tray.

FIG. 4 is another alternative preferred embodiment of the enhanced viewing device 1. This embodiment includes the document support tray 2, a camera assembly 7, and the side supports 3, as discussed in regard to the previous embodiments. In addition, it includes a lifting mechanism 10 for the document support tray 2 as discussed above in regard to figure 3. This embodiment differs from the previous embodiments in that it includes a manually operable longitudinal support drive 12, and a manually operable lateral camera assembly drive 13. The advantage of the manually operable drives for the longitudinal support 4 and that camera assembly 7 is that the cost associated with implementing the invention can be substantially reduced. However, the disadvantage associated with this embodiment is that a portion of the automation of the system is lost. The advantage of this embodiment over the prior art is that once the individual sets the line start point and the line and point, the camera assembly 7 can be moved across the length of text line on the document 9 without requiring the individual to carefully watch the monitor 14. While the individual can manually move the camera assembly 7 until it rests above the beginning of a line of text, it is preferred to have a mechanical key, such as that discussed above, to allow the individual to more quickly and easily find the beginning of line.

Regarding manual movement of the lateral support 4, it is preferred to use a line indexing device (not shown), such as that used on typewriters. The line indexing device permits the individual to step from one line to the next without having to carefully watch the monitor 14 to see the next line of text is reached. As a result, with the use of proper line start/line stop mechanical keys in combination with a line indexing device provides an individual with the ability to quickly and accurately step from the end of one line to the beginning of the next line without having to worry about errors created by variances in motion of the camera assembly 7 caused by the individual's hand motion. Even though this embodiment requires more work on the part of the individual, it still improves over the prior art devices which rely on the individual to move the camera assembly 7.

Figure 5:
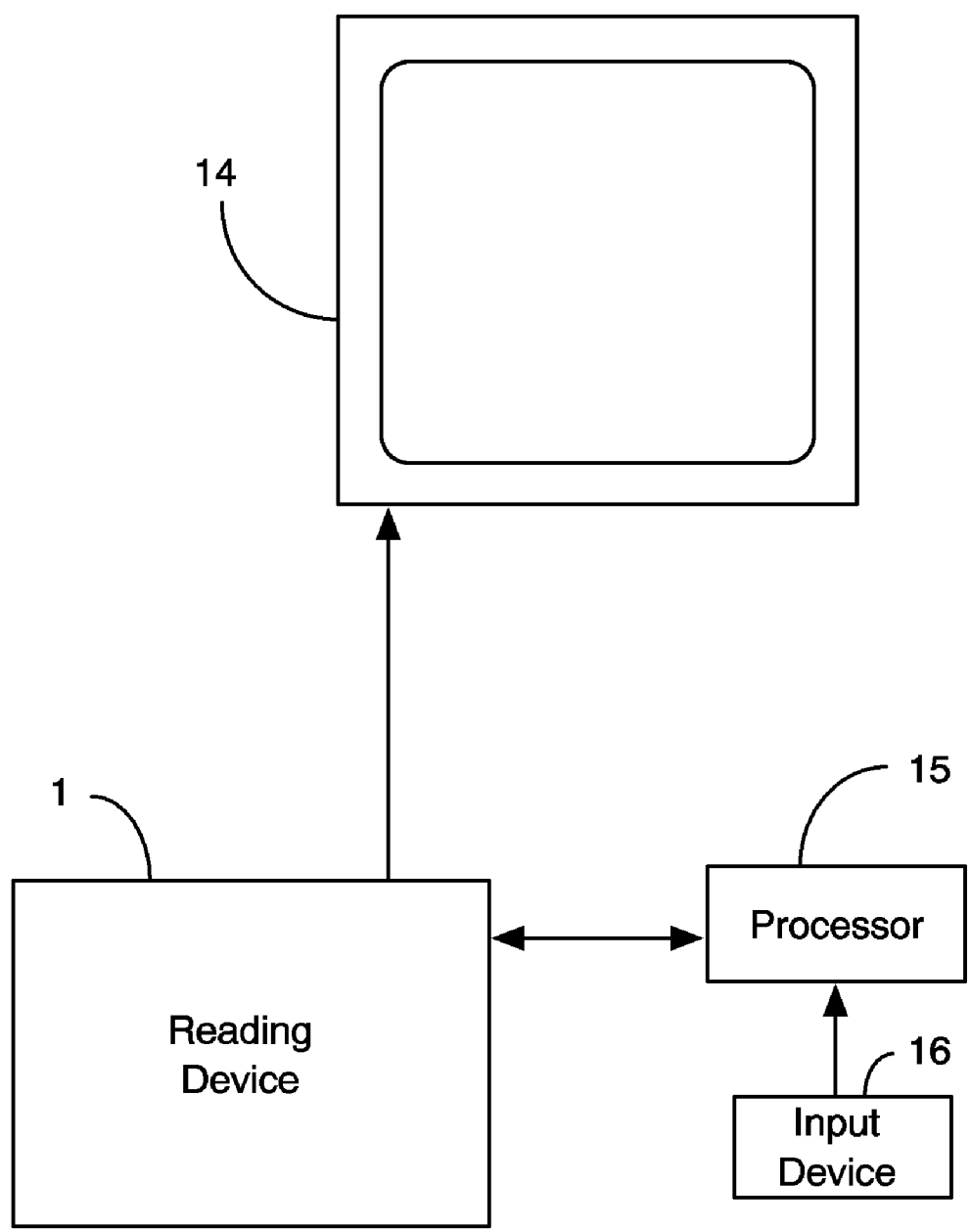
FIG. 5 is an alternative preferred embodiment of an enhanced reading device which illustrates a document support tray, a camera assembly, a manually operable longitudinal support, a manually operable lateral camera assembly support, and side supports, in combination with a lifting mechanism for the document support tray.

FIG. 5 is a preferred embodiment of the enhanced reading device 1 and the other components of the reading system disclose herein. This figure illustrates an output line from the enhanced reading device 1 to the monitor 14. In addition, a processor 15 is connected to the enhanced reading device 1 via a bidirectional data path. The bidirectional data path can provide camera assembly 7 position information to the processor 15. In addition, the processor 15 can provide commands to the enhanced reading device 1 which are used to control the position of the camera assembly 7.

The processor 15 is referred to as a processor for ease of discussion. However, while it can be implemented by a complete microprocessor, such as those used on personal computers, it can also be implemented by a much more limited function microprocessor or controller, or even a pre-programmed device such as an EEPROM. Likewise, the processor 15 and the input device 16 are illustrated as separate devices. However, as a practical matter they can both be integrated into the enhanced reading device 1 such that the enhanced reading device 1 has a single video output cable which attaches to the monitor (i.e., television) 14 and a single power input cable (not shown).

Also shown in this figure is input device 16 which is used to provide instructions from the individual to the enhanced reading device 1 via processor 15. For example, the individual can enter commands to cause the camera assembly 7 to skip from paragraph to paragraph, the individual can enter commands to cause the camera assembly 7 to move to the next line, the individual can enter commands to cause the camera assembly to backspace for the purpose of allowing the individual to review an item previously read, the individual can enter commands to set parameters such as line start position, line end position, line spacing, etc., and the individual can also enter commands to control other functions such as motion of the document lifting mechanism 10, etc. The input device 16 can be implemented by any suitable device, such as a conventional computer keyboard, a smaller limited function keyboard, or even a simple device such as a computer mouse.

Figure 6:
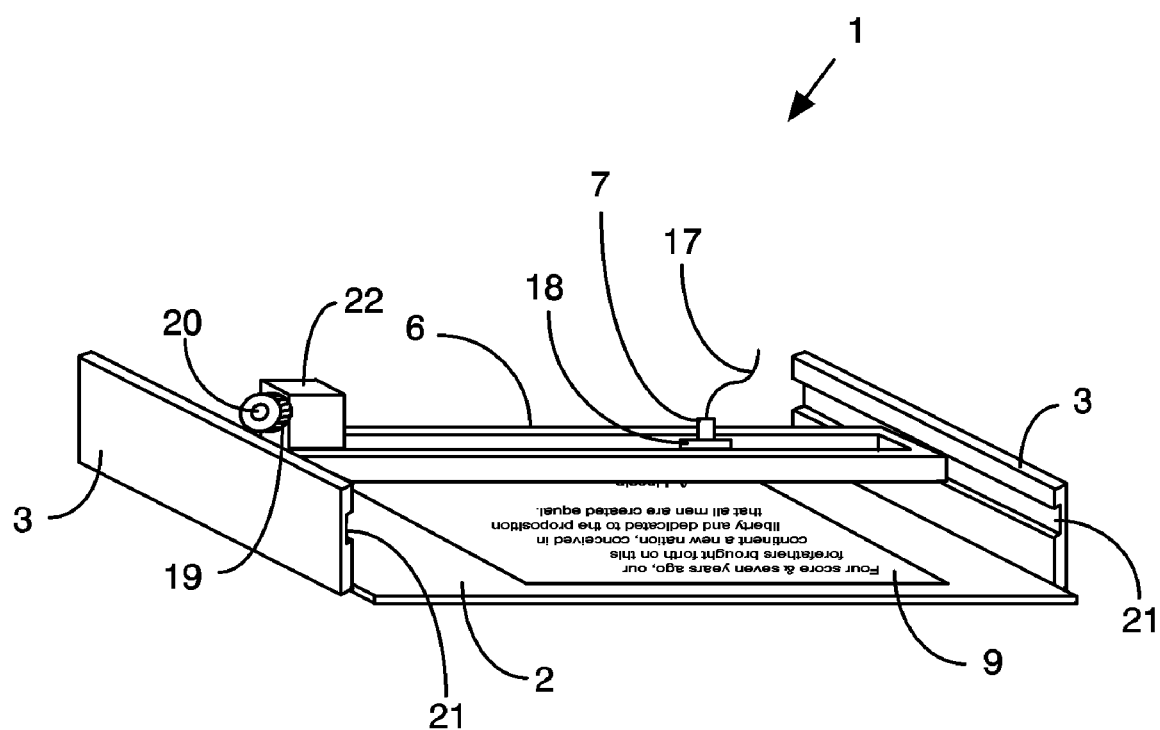
FIG. 6 is another alternative preferred embodiment which uses a multifunction knob, and which is manually driven.

FIG. 6 illustrates another alternative preferred embodiment. This embodiment differs from the previous embodiments in that the position of camera 7 is controlled directly by the individual via a single multifunction knob 19 which allows the individual to move the camera 7 laterally across a line of print. In addition, the multifunction knob 19 further allows the individual to index the camera 7 longitudinally from line to line via a push button 20 which is integrated into the multifunction knob 19.

In the preferred embodiment, when multifunction knob 19 is rotated approximately half a turn it moves the camera 7 across the entire length of line of text. This is accomplished by controlling movement of the camera 7 through a gear assembly 22 whose gear ratio causes substantial movement of the camera 7 in relation to a relatively small movement of the multifunction knob 19. An advantage provided by the gear assembly 22 is that it eliminates fatigue and effort on the part of the individual by minimizing the amount of movement required by the individual to scan a line of text. The camera 7 is secured to the sliding camera support 18 which advances the camera along the aperture defined by lateral camera support assembly 6. In the preferred embodiment, it is envisioned that the sliding camera support 18 is inserted at its edges into lateral tracks in the lateral camera support assembly 6. However, those skilled in the art will realize that numerous alternative methods can be devised to movably secure the sliding camera support 18. Likewise, those skilled in the art will recognize that numerous alternative methods of laterally moving the sliding camera support 18 can be used. The preferred embodiment uses a toothed cog assembly, but any other suitable method, such as pulleys, etc., can also be used.

Once the individual reaches the end of the print line, the knob 19 is merely rotated a half turn back to accurately return the camera 7 to the beginning of the text line. At the same time, push button 20 is pushed to index the lateral camera assembly support 6 such that the camera 7 is positioned above the next line of text. As a result, by simply rotating the knob 19 and pressing its integrated push button 20, the camera 7 is positioned at the beginning of the next line of text. This is a substantial improvement of the prior art in that the automatic positioning of the camera 7 eliminates eye fatigue. This eye fatigue is caused by the need for individuals to carefully watch the camera 7 output as it rapidly scans back to the beginning of the line to avoid inadvertent line skipping. Once the camera returns to the beginning of the line, then the individual must search for the next line. This effort is greatly reduced by the invention in that the line returns do not have to be carefully monitored. In addition, the unique mechanical structure provided herein allows the individual to position the camera 7 with a minimal amount of physical effort, and only requires the individual to use one hand.

Line indexing can be accomplished in several ways. In this figure, the push button 20 is attached to a rachet assembly which advances the lateral camera support assembly 6 along longitudinal tracks 21 when push button 20 is pressed. The longitudinal tracks 21 provide a path which moves the lateral camera support assembly 6 in a stable and controlled manner.

Figure 7:
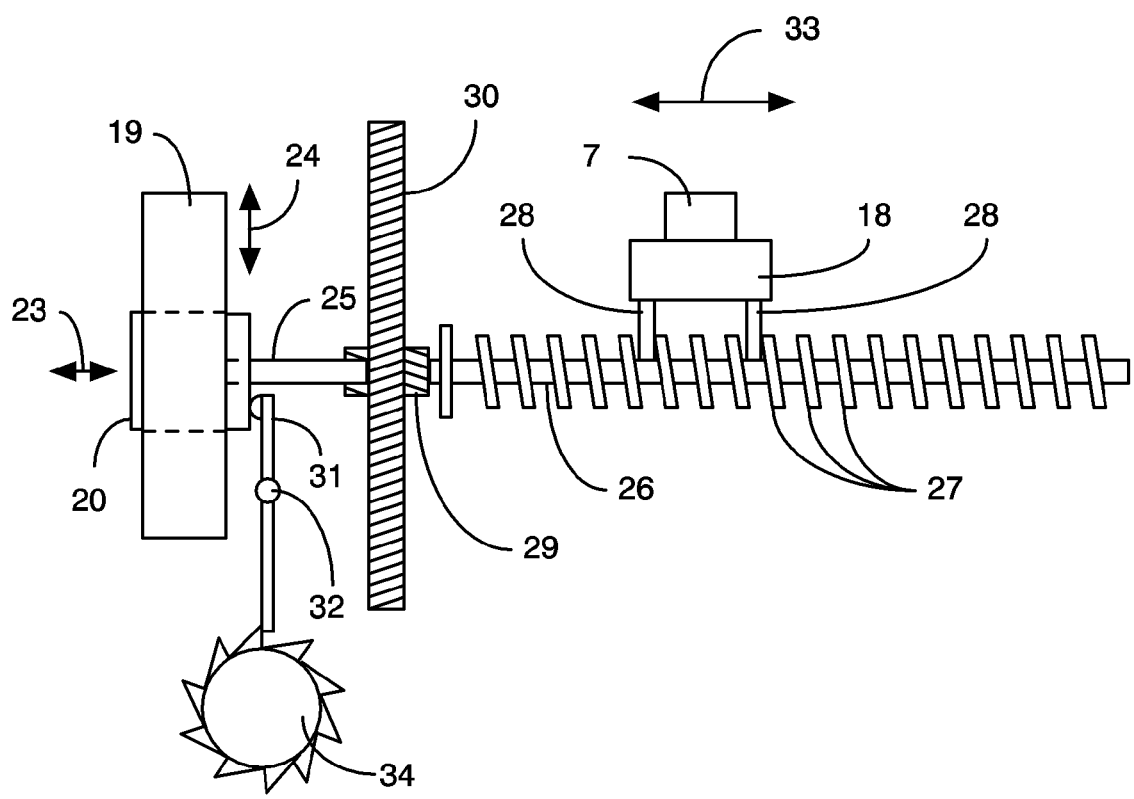
FIG. 7 is a more detailed view of a preferred embodiment of the multifunction knob and gear drive assembly.

In FIG. 7, a more detailed view of a preferred embodiment of the gear drive used to move the camera 7 is shown. In this figure, the knob 19 is rotated in direction 24 which causes attached shaft 25 to rotate in the same direction. The portion of shaft 25 adjacent to push button 20 is shown in dashed lines to indicate that its view was obstructed by the adjacent portion of push button 20. Likewise, a portion of push button 20 is shown in dashed lines to indicate that its view was obstructed by knob 19 which surrounds it. Drive gear 30 is secured to shaft 25 and it also rotates in the same direction to the shaft 25 and knob 19. Drive gear 30 is enmeshed with cog drive gear 29 and controls the movement of cog drive gear 29. Cog drive shaft 26 is attached to cog drive gear 29 and rotates in the same direction as cog drive gear 29. Cog drive shaft 26 has a cog thread 27 which engages cogs 28. As cog drive shaft 26 rotates, it causes the cog thread 27 to rotate, which in turn causes the cogs 28 to move under control of the cog thread 27. Two cogs 28 are shown in this illustration. However, those skilled in the art will recognize that the gear drive will also work with a single cog 28.

As the cogs 28 slide laterally under control of the cog thread 27, the sliding camera support 18 moves in direction 33. As a result rotational movement of knob 19 in either direction will cause camera 7 to move laterally in response to the movement of multifunction knob 19.

Also shown in this figure is push button 20. In the preferred embodiment, push button 20 is spring loaded to hold it when not in use in a disengaged position. During use, the individual would rotate knob 19 to move the camera 7 across a line of printed text. When the individual wants to read the next line, the knob 19 is rotated back to the beginning of the line and push button 20 is pressed. When push button 20 is pressed, it moves inward and contacts lever 31. Lever 31 is attached to pivot point 32. When it is moved by push button 20, it pivots about pivot point 32 and rotates ratchet assembly 34 which in turn moves the lateral camera assembly support 6 longitudinally to advance to the next line to be read. Ratchet assemblies are well known in the art and can be implemented in a variety of ways, such as using two gears, pulleys, etc., and do not have to be discussed in further detail here.

Figure 8:
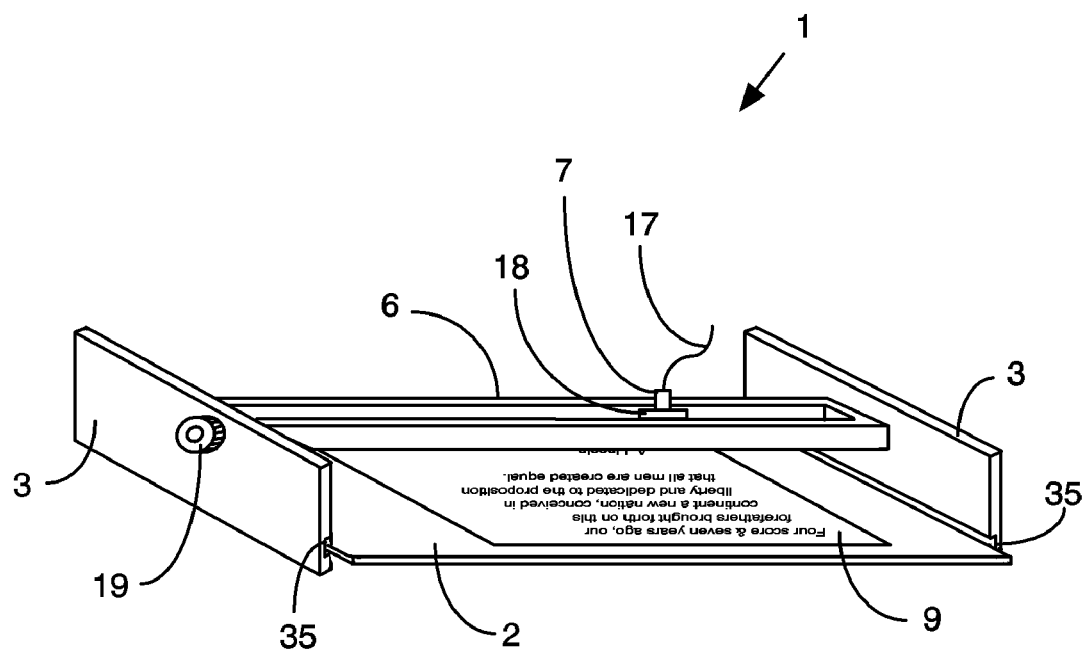
FIG. 8 is another alternative embodiment in which the lateral camera support assembly is longitudinally fixed and the document tray reciprocates in a longitudinal direction.

In FIG. 8, another alternative preferred embodiment is shown which illustrates how the multifunction knob 19 can be implemented in a different manner. In this embodiment, the lateral camera support assembly 6 is secured to side supports 3, and does not move longitudinally in relation to the side supports 3. Instead, the document support tray 2 moves longitudinally along tracks 35 under control of the gear assembly 22 (not visible in this figure). The gear assembly 22 controls lateral movement of the camera 7 in the same manner as discussed above in relation to FIG. 7. The primary difference in this embodiment is that the longitudinal indexing is performed by moving the document support tray 2 rather than the lateral camera support assembly 6, as was done previously. This is accomplished by connecting the ratchet 34 to the document support tray 2 instead of the lateral camera support assembly 6.

An advantage of this embodiment is that the individual can control movement of the camera without moving the individual's arm. Rather, the arm can be placed in a comfortable position and the camera 7 can be moved with a minimal amount of effort. Another advantage is that this invention can be implemented in an entirely mechanical fashion, such that it is extremely economical to manufacture, requires no electrical power other than that used by the camera 7 itself.

Figure 9:
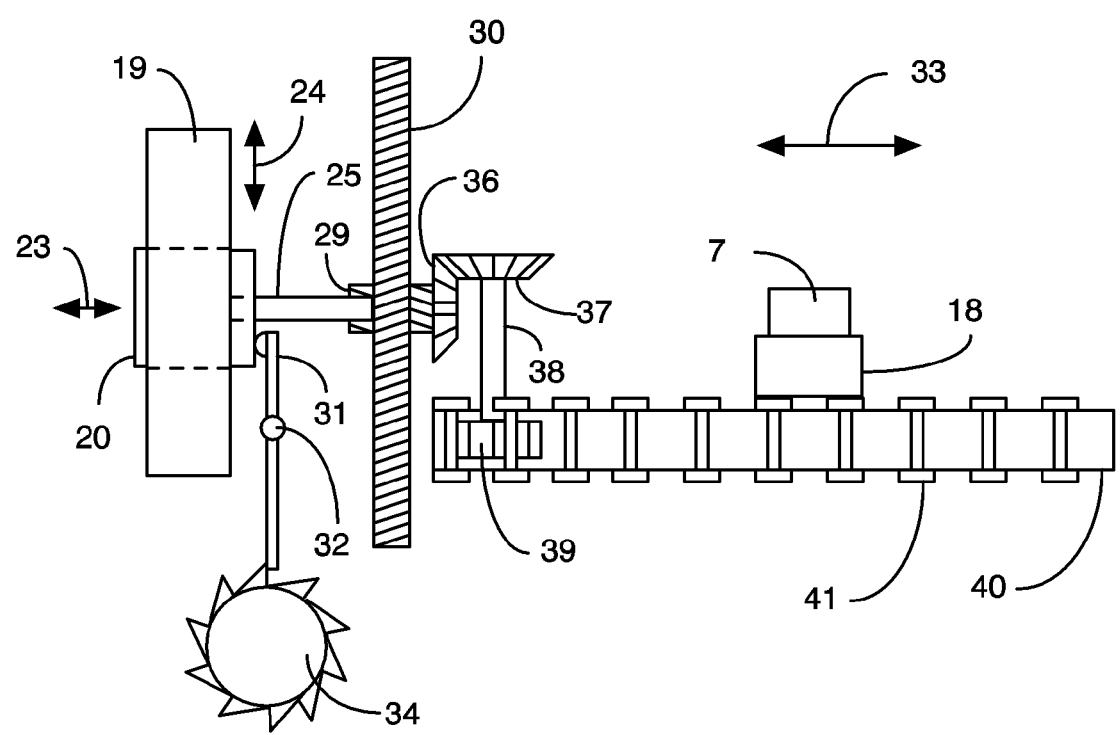
FIG. 9 illustrates another preferred embodiment of the multifunction knob and gear drive assembly which uses a chain drive.

In FIG. 9, an alternative embodiment of the gear drive used to move the camera 7 is shown. In this embodiment, the cog drive gear 29 is attached to a first beveled gear 36. When the cog drive gear 29 rotates, it in turn rotates the first beveled gear 36. The first beveled gear 36 is engaged with and causes the second beveled gear 37 to rotate. Shaft 38 is attached at one end to the second beveled gear 37, and at the other end to a toothed drive gear 39. The toothed drive gear 39 is engaged with a chain 40 which has multiple teeth 41. As shaft 38 rotates, a chain 40 is moved under control of the shaft 38 and the toothed drive gear 39. The camera 7 is attached to the sliding camera support 18, and the sliding camera support 18 is in turn attached to a chain 40. As a result, when knob 19 is rotated, it results in movement of the chain 40 and lateral movement of the camera 7 which is attached to it.

For ease of discussion, the various embodiments of the invention have shown the multifunction (i.e., the term "multifunction" is used because a single knob can be used to control both lateral and longitudinal motion of the camera 7) knob 19 disposed on the side of the enhanced reading device 1. However, those skilled in the art will recognize that it is a simple matter to move the multifunction knob 19 to the front of the enhanced reading device 1, by way of a few mechanical adjustments. Therefore, it is understood that the invention does not restrict the location of the multifunction knob 19, as illustrated in the figures and discussed in the specification, to any specific location on the enhanced reading device 1.

Figure 10:
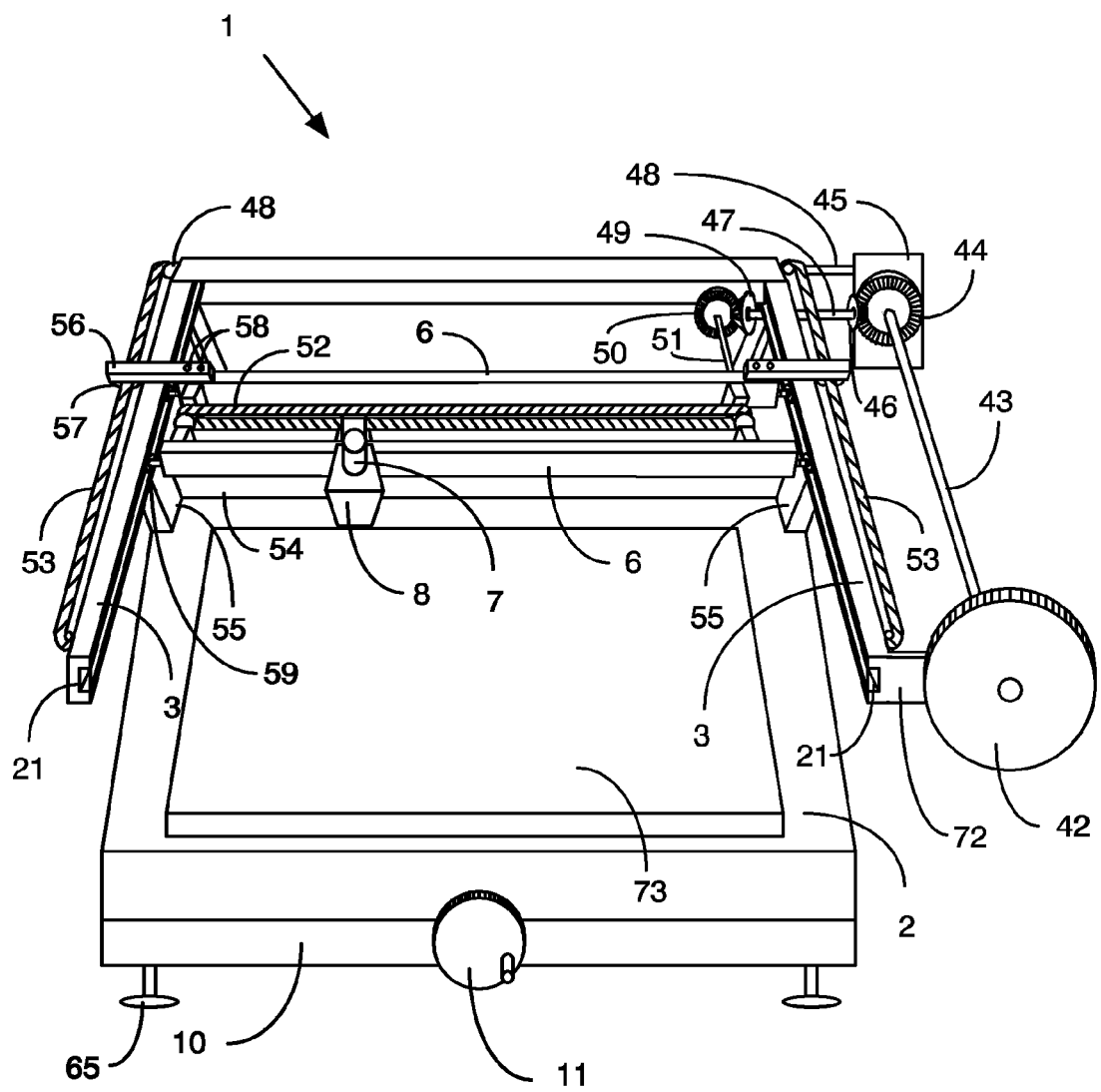
FIG. 10 illustrates a top perspective view of another preferred embodiment of the enhanced reading device which illustrates the position of the camera and its motion control assembly in relation to the document support tray.

In FIG. 10, a top perspective view of another preferred embodiment of the enhanced reading device 1 is illustrated. This figure illustrates the position of the camera 7 and its lateral camera assembly support 6 in relation to the document support tray 2. The lateral camera assembly support 6 moves forward and backward to step the camera 7 from line to line. This is accomplished by a manually controlled transmission assembly that consists of a transmission control 42 that is attached via transmission rod 43 to gears 44 and 68 (gear 68 is shown below in figure 14). Transmission rod 43 is supported by proximal bracket 72 and distal bracket 45.

Longitudinal motion of the camera 7 is controlled as follows: gear 68 controls rotation of longitudinal motion shaft 48 which drives longitudinal drive belts 53 to control longitudinal motion of the lateral camera assembly support 6. When longitudinal drive belts 53 are moved under control of longitudinal motion shaft 48, they move the lateral camera assembly support 6 which is attached via brackets 56, clamps 57 (which are attached to longitudinal drive belts 53) and mounting screws 58 (which attach bracket 56 to lateral camera assembly support 6). This figure also illustrates wheels 59 which are used to move the lateral camera assembly support 6 longitudinally with a minimum amount of friction, Of course, a simple greased slider can also be used. However, that would result in increased friction and require more force to move the lateral camera assembly support 6.

Lateral motion of the camera 7 is controlled as follows: gear 44 controls motion of gear 46 which is attached to gear 49 via rod 47. Rotation of gear 49 controls rotation of lateral drives belt 52 which in turn causes lateral motion of the camera 7 inside of the lateral camera assembly support 6. For ease of illustration, the camera 7 is illustrated as being attached via a bracket 8 outside of the lateral camera assembly support 6. However, it may be preferable to mount the camera 7 between the rails which comprise the lateral camera assembly support 6 for the purpose of balancing weight and reducing friction. Likewise, the lateral drive belt 52 can be mounted between the rails, as shown, or outside of the real assembly. In addition, those skilled in the art will recognize that the lateral drive belt 52 can be eliminated and replaced with a worm gear or a chain drive. As was the case above, in regard to longitudinal motion, the lateral motion of the camera can also be made easier through the use of wheeled mounts rather than a slider as was discussed in previous embodiments.

Optional transparent plate 73 is shown resting on top of the document support tray 2. Transparent plate 73 is used to flatten the paper document to allow the camera 7 to be more easily focused. It can be manufactured from any transparent material, such as glass, Lucite, Lexan, etc. Non-glass materials are preferred for fabrication of the transparent plate 73 because they resist breakage better than glass.

The document support tray 2 is raised via rotation of height control knob 11. Raising and lowering of the document support tray 2 allows the reader to manually control the amount of magnification by adjusting the distance between the camera 7 and the document support tray 2. Of course, those skilled in the art will recognize that electronic magnification can also be used by controlling the size of the detected image via software. However, this is a more expensive and complex method.

Adjustable foot pads 65 are also shown in this figure. The adjustable foot pads allow the enhanced reading device 1 to be placed on an uneven surface support and be adjusted so that it remains stable when used.

Figure 11:
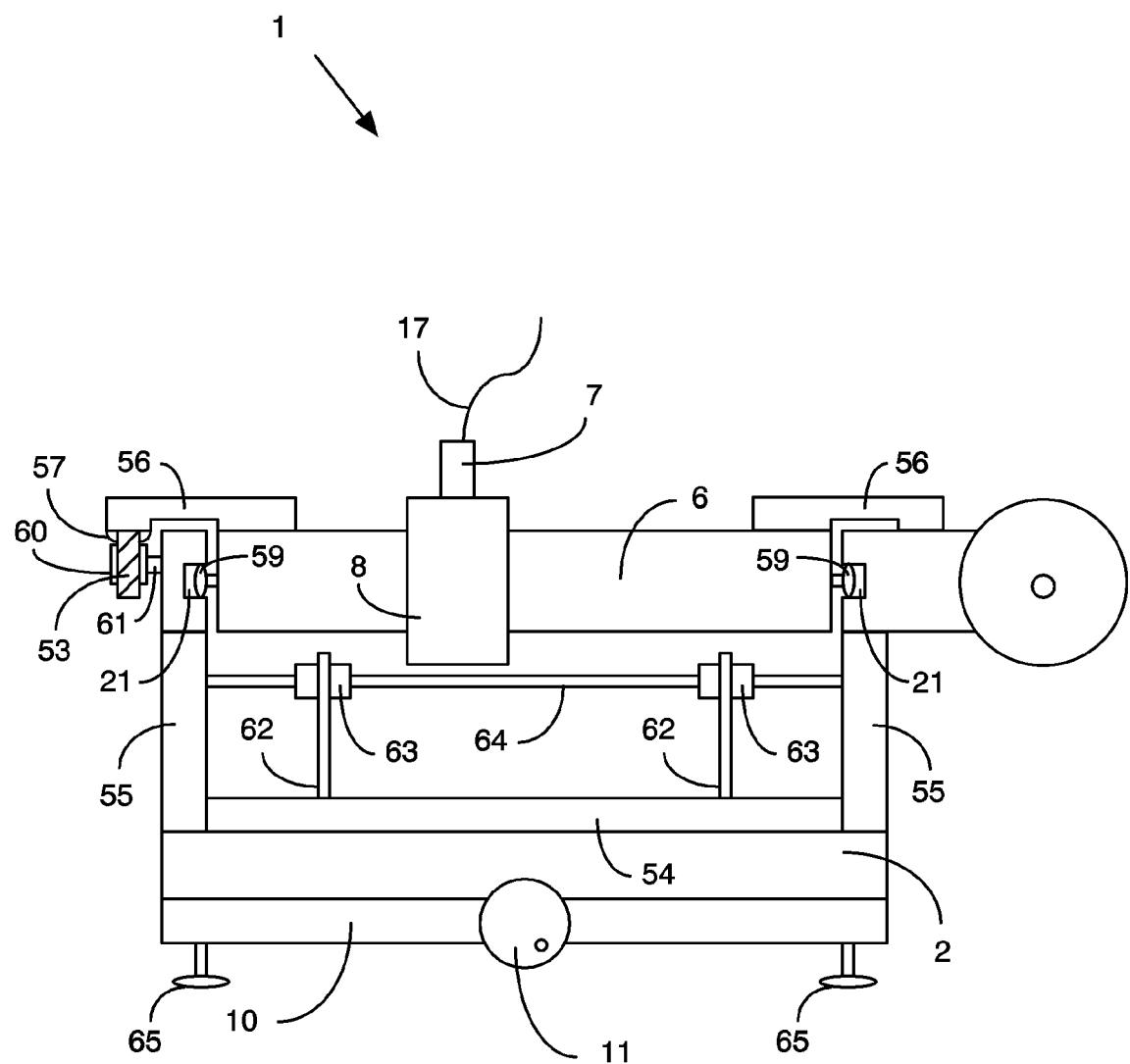
FIG. 11 illustrates a front orthogonal view of a preferred embodiment of the invention which illustrates the belt drive and roller assembly used to transport the camera over the document support tray.

In regard to figure 11, this figure illustrates a front orthogonal view of a preferred embodiment of the enhanced reading device 1. This figure also illustrates the belt drive and roller assembly used to transport the camera 7 over the document support tray 2. In particulars the lateral camera assembly support 6 slides on wheels 59 along tracks 21. Wheels 59 are preferred because they provide the minimum amount of friction and require the least amount force to longitudinally move the lateral camera assembly support 6. Also shown in this figure are bracket assemblies 56 which attach to longitudinal drive belts 53 via clamps 57. Bracket assemblies 56 also attached to lateral camera assembly support 6 such that movement of the longitudinal drive belts 53 causes longitudinal movement of the lateral camera assembly support 6.

Also shown in this figure are lift arms 62 which provide upward left for document support tray 2 under control of height control knob 11.

Figure 12:
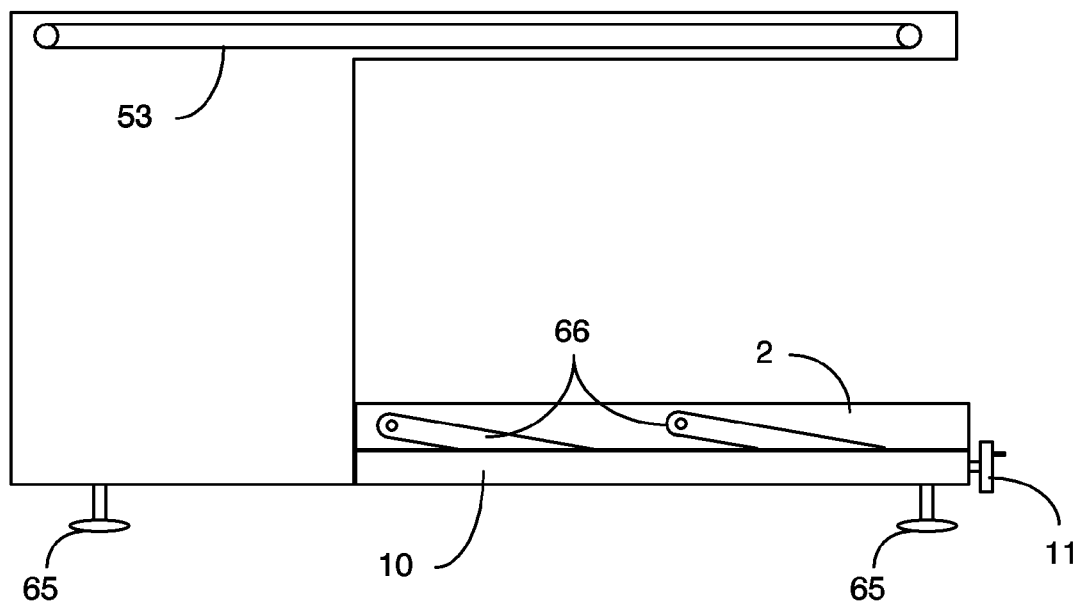
FIG. 12 is a left side orthogonal view of a preferred embodiment of the invention. This view illustrates the document tray in the fully lowered position with the side support bars lowered.

FIG. 12 is a left side orthogonal view of a preferred embodiment of the enhanced reading device 1. This view illustrates the document tray 2 in the fully lowered position with the side support bars 66 lowered. Also shown in this figure is longitudinal drive belts 53. Other elements of the embodiment have been eliminated for ease of illustration and discussion.

Figure 13:
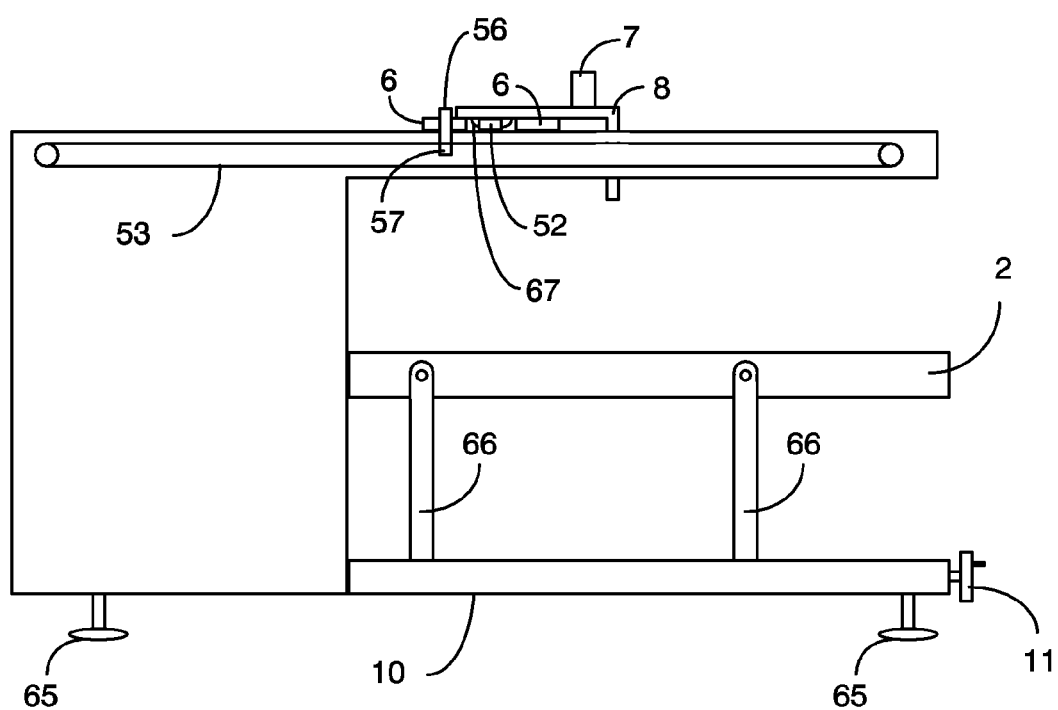
FIG. 13 is a left side orthogonal view of a preferred embodiment of the invention which illustrates the document support tray in the fully raised position with the side support bars raised.

In FIG. 13, a left side orthogonal view of a preferred embodiment of the enhanced reading device 1 is illustrated. This figure illustrates the document support tray 2 in the fully raised position with the side support bars 66 raised.

Figure 14:
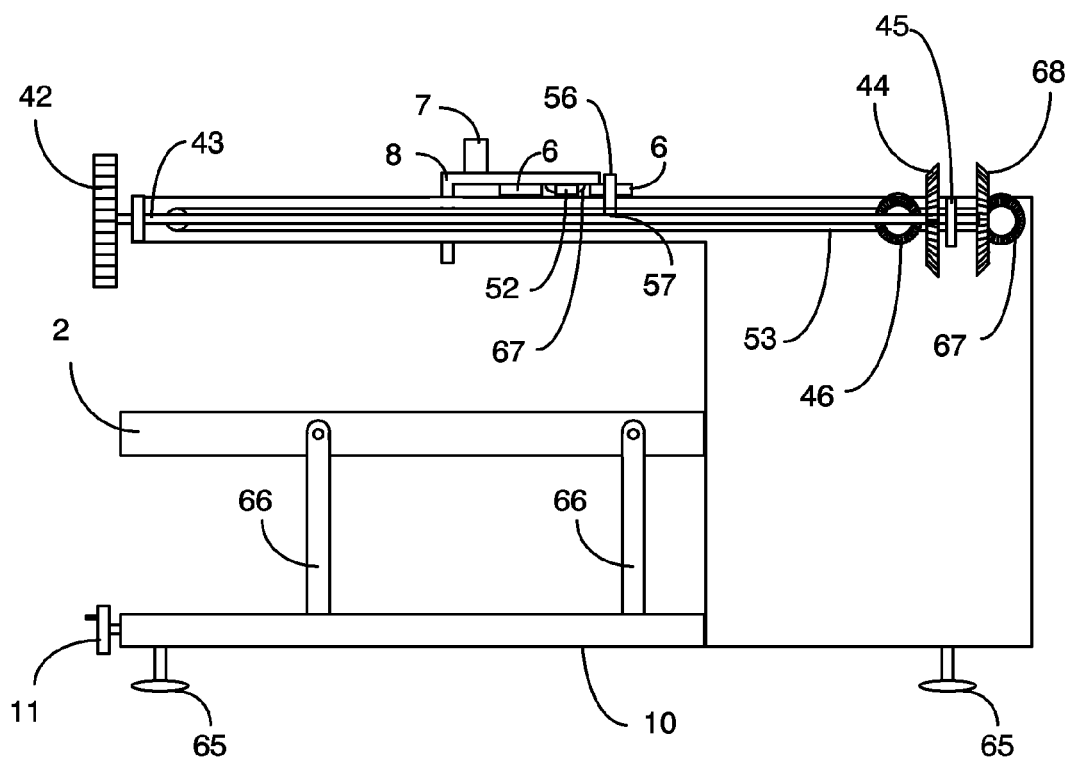
FIG. 14 is a right side orthogonal view of a preferred embodiment of the invention which illustrates the manual transmission used to control movement of the camera assembly. The document support tray is also shown in the fully raised position in this figure.

FIG. 14 is a right side orthogonal view of a preferred embodiment of the enhanced reading device 1 which illustrates the manual transmission used to control movement of the camera 7. Both longitudinal and lateral motion of the camera 7 is controlled by transmission control knob 42 which both rotates shaft 43 and moves it longitudinally to engage and disengage gears 44, 68. When pushed in, gear 68 engages gears 67 which controls longitudinal motion of the lateral camera assembly support 6. When pulled out, gear 68 is engages and gear 44 engages gear 46 which in turn controls movement of camera 7 in a lateral direction. The document support tray 2 is also shown in the fully raised position in this figure. The position of document support tray 2 is controlled by height control knob 11.

Figure 15:
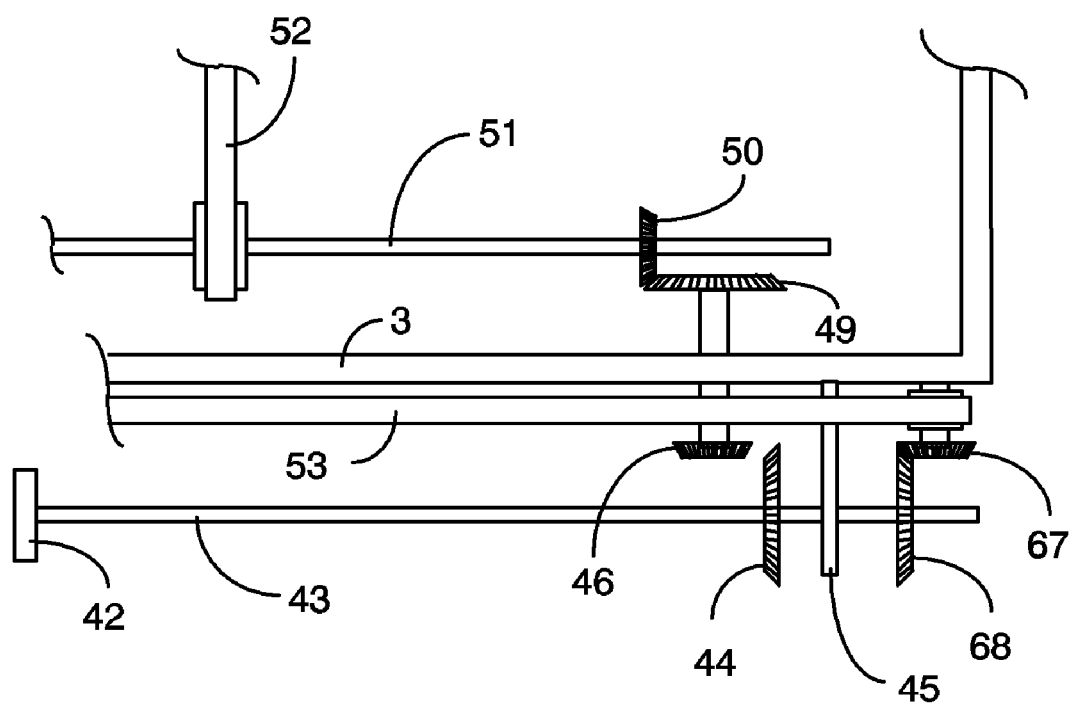
FIG. 15 is a partial top orthogonal view of a preferred embodiment of the invention which illustrates the gear assembly used by the manual transmission which controls movement of the camera assembly.

FIG. 15 is a partial top orthogonal view of a preferred embodiment of the enhanced reading device 1. This figure provides a close-up view of the gear assembly used by the manual transmission which controls movement of the camera 7. The manual transmission is comprised of transmission control knob 42, shaft 43, and gears 44, 46, 49, 50, 67, 68. To drive the lateral camera assembly support 6 in a longitudinal direction, transmission control knob 42 is pushed in which engages gears 68 and 67. Then, transmission control knob 42 is rotated which in turn rotates shaft 48 which then drives longitudinal drive belts 53. Likewise, to drive camera 7 in a lateral direction, transmission control knob 42 is pulled out to disengage the longitudinal gears, and to engage the lateral gears. In particular, this will disengage gears 68 and 67 which in turn disables longitudinal drive belts 53, and at the same time, it will engage gears 44 and 46. When gears 44 and 46 are engaged, transmission control knob 42 is then rotated which causes gear 46 to rotate. Gear 46 is directly connected to gear 49 which is engaged with gear 50 and causes gear 50 to rotate. Rotation of gear 50 causes shaft 51 to rotate which in turn moves lateral drive belt 52 and causes the camera 7 to move laterally.

Figure 16:
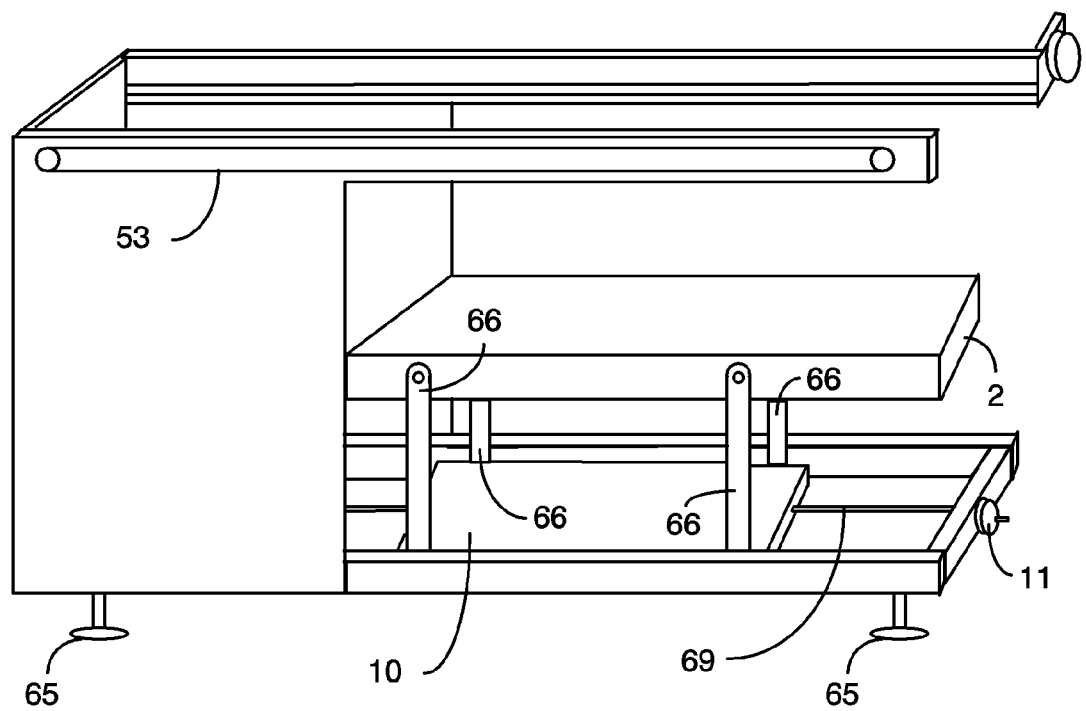
FIG. 16 illustrates a left front perspective view of a preferred embodiment of the invention. This figure illustrates the threaded rod used to control the vertical position of the document support tray.

FIG. 16 illustrates a left front perspective view of a preferred embodiment of the enhanced reading device 1. In this figure, a threaded rod 69, which is attached to height control knob 11, is used to control the vertical position of the document support tray 2. When height control knob 11 is rotated, the threaded rod 69 rotates. This causes support tray 10 to move longitudinally. As support tray 10 moves longitudinally, side support bars 66, in conjunction with lift arms 62 (discussed below and regard to FIG. 17), push the document support tray 2 in upward direction. The side support bars 66 act to stabilize the document support tray 2 and to control its vertical movement. For ease of illustration, elements of the enhanced reading device 1 which are not necessary to the discussion of the document support tray 2 have been omitted.

Figure 17:
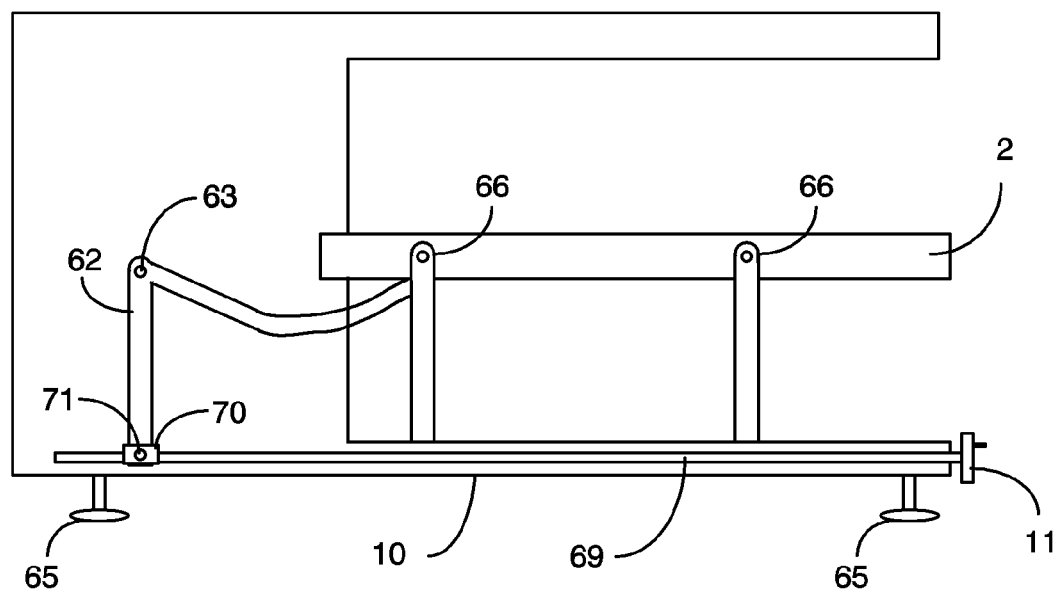
FIG. 17 illustrates a left cut away view of a preferred embodiment of the invention which shows the document support tray lift arm which is controlled by the threaded rod.

In figure 17, a left cut away view of a preferred embodiment of the enhanced reading device 1 is illustrated. This figure illustrates how the document support tray lift arms 62 are used to control vertical motion of the document support tray 2. In a preferred embodiment, two lift document support tray lift arms 62 are used because they provide more stable motion of the document support tray 2. However, those skilled in the art will recognize that a single document support tray lift arm 62 embodiment can also be implemented. As discussed above, movement of the support tray 10 causes the lower pivot points of the support arms 66 to move to the rear of the enhanced reading device 1. This causes the side support bars 66 to move towards a more vertical orientation which causes the document support tray 2 to move upwards. As noted, movement of the support tray 10 is controlled by rotation of the threaded rod 69 under control of height control knob 11. In addition, the threaded rod 69 is also attached to the document support tray lift arm 62 via sleeve 70. When the threaded rod 69 is rotated, the document support tray lift arms 62 rotate about pivot point 63. Rotation of the threaded rod 69 causes the sleeve 70 to move longitudinally. In addition sleeve 70 is also attached to a slider rod 71 that moves along a longitudinal track to control movement of the support tray lift arms 62. The sleeve 70 is attached to the slider rod 71 via a slot to allow the sleeve 70 to move freely. While the lower ends of the document support tray lift arms 62 are attached to the sleeve 70, the upper ends of the document tray lift arm 62 are in contact with the document support tray 2 and provide an upward lifting force which is controlled by rotation of the threaded rod 69 under control the height control knob 11.

The purposes and goals of the invention can be implemented in a variety of manners. In summary, this invention provides an automated line detection and registration system which can automatically detect the beginning of text on a page, it can automatically detect the length of lines on a page, and it can automatically detect distance between lines such that a sight impaired individual can easily move through printed text which is displayed on a monitor with a minimal amount of effort and a high degree of accuracy. A variety of embodiments have been presented which illustrate how the beginning of a page can be selected automatically via known line detection techniques from optical scanner technology, or manually via direct user control. Likewise, embodiments have been shown which automatically determine line start, line end, and line spacing, also through known line detection techniques from optical scanner technology, or manually via direct user control. In addition to the electronic embodiments, other embodiments show mechanical methods of controlling camera positioning. Embodiments have been presented which use automatic focusing as well as manual focusing. Manual focusing can be achieved via document lifting mechanisms 10 or through direct user control of focus adjustment on the camera assembly 7. The invention provides a device which steps through text in a given text line without line skipping associated with manually held camera, and also allows individual to easily move the camera assembly 7 to the beginning of the next line. As a result, the individual is not burdened with the difficulties associated with prior art devices, such as skipping lines when manually moving the camera assembly 7 backwards at high-speed to the beginning of the next line and then to manually index to the following line. By eliminating the possibility of inadvertent line skipping of the camera assembly 7 created by the individual, the visual distraction of the high-speed movement, and the potential for error in manual positioning, are both eliminated. The individual can then read the document 9 in a more relaxed and convenient environment.

As noted above, a variety of exemplary embodiments have been shown which illustrate mechanical components of the system. However, it is understood that any number of variations can be used for each of the functional features of the invention. The only requirement is that each functional component be able to complete its intended purpose.

While the invention has been described with respect to a preferred embodiment thereof, it will be understood by those skilled in the art that various changes in detail may be made therein without departing from the spirit, scope, and teaching of the invention.

I claim:

1. An enhanced reading device for reading documents, comprising:
    a document support tray having a size suitable for supporting printed material;
    a video camera, positioned above the document support tray and selectively movable such that video images of selectable portions of documents resting on the document support tray are input by the video camera; and
    display means to display video data output from the video camera;
    a transmission gear drive, the transmission gear drive having first drive means to control longitudinal movement of the video camera, and second drive means to control lateral movement of the video camera;
    a transmission control knob;
    a rotatable and longitudinally slidable drive shaft attached at its distal end to the transmission gear drive and at its proximal and to the control knob, such that in a first position the transmission gear drive provides longitudinal motion control to the video camera, and when in a second position the transmission gear drive provides lateral motion control to the video camera;
    whereby a single control knob is used to control both lateral and longitudinal motion of the video camera.

2. A device, as in claim 1, further comprising:
    a lateral camera assembly support, comprising:
    longitudinal motion control means for controlling longitudinal motion of the video camera above the document support tray;
    lateral motion control means for controlling lateral motion of the video camera above the document support tray;
    whereby the location of the video camera is selectively located above the document support tray.

3. A device, as in claim 2, wherein the lateral motion control means further comprises:
- a lateral camera assembly support having means to support the video camera, and means to move the video camera laterally such that the video camera, when moving laterally across the document, inputs video images of at least a portion of a line of text in the document;
- whereby the text from the document is selectively input to the video camera.

4. A device, as in claim 3, wherein the longitudinal motion control means further comprises:
- means to longitudinally move the lateral camera assembly support such that the video camera is moved from one line of text to another;
- whereby the video camera controls the movement from one line to another for input to the video camera.

5. A device, as in claim 4, wherein the longitudinal motion control means and the lateral motion control means are independently controllable.

6. A device, as in claim 4, further comprising:
- a transparent panel sized such that it is removably placed over at least a portion of the document support tray, the transparent panel having sufficient weight to press a document flat when the transparent panel is laid on top of the document, the transparent panel having sufficient transparencies such that the camera produces an image of the document when it is covered by the transparent panel.

7. A device, as in claim 6, wherein the camera further comprises an auto focus function.

8. A device, as in claim 3, further comprising:
- a transparent panel sized such that it is removably placed over at least a portion of the document support tray, the transparent panel having sufficient weight to press a document flat when the transparent panel is laid on top of the document, the transparent panel having sufficient transparencies such that the camera produces an image of the document when it is covered by the transparent panel.

9. A device, as in claim 3, wherein the camera further comprises an auto focus function.

10. A device, as in claim 3, further comprising:
- a lift mechanism positioned under the document support tray, the lift mechanism further having means to raise or lower the document support tray such that the document on the tray is moved closer to or farther from the camera.

11. A device, as in claim 1, further comprising:
- a transparent panel sized such that it is removably placed over at least a portion of the document support tray, the transparent panel having sufficient weight to press a document flat when the transparent panel is laid on top of the document, the transparent panel having sufficient transparencies such that the camera produces an image of the document when it is covered by the transparent panel.

12. A device, as in claim 1, wherein the camera further comprises an auto focus function.

13. A method of displaying printed documents with an enhanced reading device, including the steps of:
- placing a printed document where it is read by a moving camera;
- moving the camera longitudinally and laterally by moving a rotatable control knob that is attached to a transmission gear drive between a first drive position that controls longitudinal movement of the camera, and a second drive position that controls lateral movement of the camera, such that, based on the position of the control knob and the direction of rotation, the camera longitudinally or laterally moves to selected portions of the document for input to the camera;
- connecting the control knob to the transmission gear drive with a rotatable and longitudinally slidable drive shaft attached at its distal end to the transmission gear drive and at its proximal end to the control knob, such that when in a first position the transmission gear drive provides longitudinal motion control to the camera, and when in a second position the transmission gear drive provides lateral motion control to the camera; and
- outputting a video image of the selected portions of the document from the camera to a monitor device which displays an enlarged image of the photographed text;
- whereby a single control knob is used to control both lateral and longitudinal motion of the camera.

14. A method, as in claim 13, including the additional step of providing a method of automatically focusing the camera.

15. A method, as in claim 13, including the additional steps of providing a means to move the printed document vertically to vary the distance between the document and the camera.

* * * * *